US009469964B2

(12) United States Patent
Nakamura et al.

(10) Patent No.: US 9,469,964 B2
(45) Date of Patent: Oct. 18, 2016

(54) PIPE MOUNTING STRUCTURE IN WORK MACHINE

(75) Inventors: Takanobu Nakamura, Hiroshima (JP); Yasushi Shigenari, Hiroshima (JP); Takanori Yamasaki, Hiroshima (JP)

(73) Assignee: KOBELCO CONSTRUCTION MACHINERY CO., LTD., Hiroshima-shi (JP)

( * ) Notice: Subject to any disclaimer, the term of this patent is extended or adjusted under 35 U.S.C. 154(b) by 59 days.

(21) Appl. No.: 14/239,883

(22) PCT Filed: Aug. 6, 2012

(86) PCT No.: PCT/JP2012/004979
§ 371 (c)(1),
(2), (4) Date: Feb. 20, 2014

(87) PCT Pub. No.: WO2013/027344
PCT Pub. Date: Feb. 28, 2013

(65) Prior Publication Data
US 2014/0191092 A1 Jul. 10, 2014

(30) Foreign Application Priority Data
Aug. 24, 2011 (JP) .................................. 2011-182645

(51) Int. Cl.
*F16L 3/22* (2006.01)
*E02F 3/36* (2006.01)
(Continued)

(52) U.S. Cl.
CPC ................. *E02F 3/36* (2013.01); *E02F 3/302* (2013.01); *E02F 3/369* (2013.01); *E02F 9/2275* (2013.01); *F16L 3/223* (2013.01); *F16L 3/227* (2013.01); *F16L 3/2235* (2013.01)

(58) Field of Classification Search
CPC .... E02F 9/2275; E02F 3/3654; E02F 9/0858
See application file for complete search history.

(56) References Cited

U.S. PATENT DOCUMENTS 3,620,268 A * 11/1971 Loftus et al. ................. 141/388
3,860,175 A * 1/1975 Westerlund et al. ......... 239/165
(Continued)

FOREIGN PATENT DOCUMENTS

| CN | 1532347 A | 9/2004 |
| JP | 49 137301 | 11/1974 |

(Continued)

OTHER PUBLICATIONS

International Search Report Issued Nov. 6, 2012 in PCT/JP12/004979 Filed Aug. 6, 2012.
(Continued)

*Primary Examiner* — Bradley Duckworth
(74) *Attorney, Agent, or Firm* — Oblon, McClelland, Maier & Neustadt, L.L.P.

(57) ABSTRACT

A pipe mounting structure of a work machine that has a lightweighted structure and is able to stably mount many pipes thereon includes a structure for mounting pipes to a work machine such as a demolition machine. The structure includes at least a pair of protruding portions formed by upwardly protruding end portions of side plates of a front boom, a bridge member that is bridged between the pair of protruding portions, and connecting portions that connect the protruding portions and the end portions of the bridge member to each other, and the plurality of pipes are fixed to the bridge member.

8 Claims, 15 Drawing Sheets

(51) Int. Cl.
  *E02F 3/30* (2006.01)
  *E02F 9/22* (2006.01)
  *F16L 3/223* (2006.01)
  *F16L 3/227* (2006.01)

(56) References Cited

U.S. PATENT DOCUMENTS

| | | | |
|---|---|---|---|
| 3,981,329 A * | 9/1976 | Wohlwend | 137/615 |
| 3,999,784 A * | 12/1976 | Kennedy, Jr. | 285/62 |
| 4,105,046 A * | 8/1978 | Sturgis | 137/594 |
| 4,265,063 A * | 5/1981 | Muller | 52/115 |
| 4,304,077 A * | 12/1981 | Muller | 52/115 |
| 5,108,253 A * | 4/1992 | Kobayashi et al. | 414/694 |
| 6,758,024 B1 * | 7/2004 | Mieger et al. | 52/839 |
| 6,872,043 B2 * | 3/2005 | Yukawa et al. | 414/694 |
| 7,464,967 B2 * | 12/2008 | Mieger et al. | 285/124.5 |
| 7,798,738 B2 * | 9/2010 | Kawamoto et al. | 403/38 |
| 8,505,570 B2 * | 8/2013 | Wimmer | 137/355.17 |
| 8,523,120 B2 * | 9/2013 | Asano et al. | 248/68.1 |
| 8,770,537 B2 * | 7/2014 | Go | 248/560 |
| 8,820,821 B2 * | 9/2014 | Ushiroguchi | 296/193.07 |
| 8,920,105 B2 * | 12/2014 | Moriguchi et al. | 414/695.5 |
| 8,950,538 B2 * | 2/2015 | Kurauchi | 180/89.1 |
| 8,951,001 B2 * | 2/2015 | Lau et al. | 414/723 |
| 2004/0159751 A1 * | 8/2004 | Boon et al. | 248/74.1 |
| 2004/0187366 A1 | 9/2004 | Yoshida et al. | |
| 2008/0110650 A1 * | 5/2008 | Martin et al. | 172/667 |
| 2012/0097468 A1 * | 4/2012 | Takeda et al. | 180/311 |
| 2013/0108405 A1 * | 5/2013 | Huissoon | 414/694 |
| 2013/0280021 A1 * | 10/2013 | Knuth | 414/718 |
| 2014/0003901 A1 * | 1/2014 | Takagi et al. | 414/687 |
| 2014/0112749 A1 * | 4/2014 | Doll et al. | 414/685 |
| 2014/0227071 A1 * | 8/2014 | Maki et al. | 414/685 |
| 2014/0252179 A1 * | 9/2014 | Go et al. | 248/74.1 |

FOREIGN PATENT DOCUMENTS

| | | |
|---|---|---|
| JP | 49-137301 U | 11/1974 |
| JP | 59 168086 | 11/1984 |
| JP | 60-154449 U | 10/1985 |
| JP | 61 198352 | 12/1986 |
| JP | 9-177126 A | 7/1997 |
| JP | 10 159121 | 6/1998 |
| JP | 2002 348910 | 12/2002 |
| JP | 2004-108055 A | 4/2004 |

OTHER PUBLICATIONS

Extended European Search Report issued Apr. 22, 2015 in Patent Application No. 12825619.5.

* cited by examiner

PIPE MOUNTING STRUCTURE IN WORK MACHINE

TECHNICAL FIELD

The present invention relates to a pipe mounting structure in a work machine.

BACKGROUND ART

A work machine such as a hydraulic excavator is provided with a boom that is liftably mounted to a base machine, and an arm that is mounted at the tip end of the boom to be able to rotate about a horizontal axis. A plurality of pipes are mounted onto an upper plate of the boom or the like so as to extend along the boom or the arm. The respective pipes are used to guide a hydraulic oil for driving the arm and a work device at the tip end of the arm by hydraulic pressure.

In general, each of the boom and the arm has a tubular shape. The boom or the arm is manufactured by welding a pair of side plates to both sides of the long upper plate and lower plate. A block for fixing the pipes is welded and fixed to the surface of the upper plate. The pipes are fastened by bolts between the block that is fixed to the surface of the upper plate and a mounting bracket. Thereby, the pipes are fixed to the block.

According to the mounting structure of the pipes like this, strength is required in the upper plate of the boom, the arm or the like. However, the block for fixing the pipes is mounted onto the upper plate by the welding. For this reason, when bending stress or other stress is applied to the boom or the arm at the time of using the work machine, stress concentration may be caused at a welded end portion of the block. This may cause the possibility that fatigue strength is reduced at the periphery of the welded end portion of the upper plate of the boom or the arm.

Particularly, an attachment formed by a long boom and arm may be used in the work machine such as a demolition machine, a handling machine or the like. From the viewpoint of stability and the like at the time of using the work machine, it is necessary to reduce the weight by reducing the plate thickness of the upper plate and the like of the boom and the arm, or by reducing the cross section of the boom and the arm. Meanwhile, the long attachment is longer than a backhoe and the like, and it is likely that larger bending load or the like is applied to the long attachment. This may cause the stress concentration at the welded end portion of the block in the upper plate. Thereby, cracks may be caused in the upper plate of the boom or the arm in the periphery of the welded end portion. This causes such a problem that the reduction in weight is difficult to achieve.

The following measures have been proposed conventionally against the problem in fixing the pipes.

First, according to a pipe fixing structure of Patent Document 1, a long plate-shaped bridging member is provided to fix the pipes. Bending portions are provided at both ends of the bridging member. The bridging member is arranged along the upper plate of the boom in the width direction of the boom. The tip end of the bending portion at one end of the bridging member abuts against one of boom side plates. The tip end portion of a bolt screwed to a screw hole in the bending portion at the other end of the bridging member is pressed against the other boom side plate. Thus, the bridging member is fixed onto the upper side of the boom. With the configuration like this, the tip end of the bending portion at one end of the bridging member and the tip end of the bolt fixed to the bending portion at the other end clamp the boom from the both side surfaces, while a plurality of pipes are fixed to the bridging member in advance, so that the plurality of pipes can be fixed to the boom.

Further, according to a pipe fixing structure of Patent Document 2, a projection is formed by upwardly extending a part of a boom side plate. A plurality of through holes are formed in the projection. The tip end portions of fixtures, such as U-bolts, for fixing the pipes penetrate through the through holes. The tip end portions of the U-bolts are fastened by nuts.

According to the pipe fixing structure described in Patent Document 1, however, the boom is clamped from the both side surfaces by the bending portion of the bridging member and the bolt, and the pipes and the bridging member are fixed to the boom by the clamping force. However, the fixing method like this is less stable as compared with the fixing method such as the welding and the like. As a result of this, the bridging member may be displaced or fallen off from the boom, when the large bending load is applied to the boom at the time of operating the work machine. In addition, when the work device that produces strong vibration, such as a nibbler, a breaker or the like, is used as the work device to be mounted at the tip end of the arm, the bridging member may be displaced from the predetermined position due to pulsation of the hydraulic oil inside the pipes and the vibration transmitted through the pipes.

Further, in order to increase the clamping force of the bridging member, it is necessary to increase the cross section of the bridging member and to improve its rigidity. Therefore, the weight of the bridging member itself may be increased.

Meanwhile, according to the pipe fixing structure described in Patent Document 2, the projection is formed by upwardly extending a part of the boom side plate. The pipes are fastened to the projection by the fixtures such as the U-bolts. Even though the projection is formed on the both side plates of the boom in the structure like this, the number of the pipes that can be fixed to the projections is no more than two. Therefore, it is only a pair of pipes, forming a circuit of one reciprocation, or the like, that is fixed to the projections. Thus, it is difficult to fix the many pipes. In general, when the work device such as the nibbler, a grapple or the like that is driven by the hydraulic pressure is attached at the tip end of the long attachment, the many pipes are necessary to supply the hydraulic oil for operating such a work device (for example, four or five pairs of pipes are required to form a circuit of four or five reciprocations). However, according to the pipe fixing structure described in Patent Document 2, it is difficult to fix all the pipes to the projections.

Patent Document 1: Japanese Utility Model Application Laid-open No. S59-168086
Patent Document 2: Japanese Utility Model Application Laid-open No. S61-198352

SUMMARY OF THE INVENTION

An object of the present invention is to provide a pipe mounting structure of a work machine that has a light-weighted structure and is able to stably mount many pipes thereon.

The pipe mounting structure of the work machine according to the present invention is for mounting a plurality of pipes on an outer peripheral surface of at least one of a boom and an arm of the work machine provided with the boom that is liftably mounted to a base machine, and the arm that is mounted at a tip end of the boom to be able to rotate about a horizontal axis, the pipe mounting structure including a mounting portion, to which the plurality of pipes are mounted, the mounting portion being provided to at least one of the boom and the arm and having an upper plate, a lower plate provided at a position separated from the upper plate in a downward direction, and a pair of side plates arranged on both sides in a width direction of the upper plate and the lower plate, end portions of the upper plate, the lower plate or the side plates protruding outwardly to form at least a pair of protruding portions, a bridge member which is bridged between the pair of protruding portions, the plurality of pipes being fixed to the bridge member, and a connecting portion which connects the protruding portions and end portions of the bridge member to each other.

BEST MODE FOR CARRYING OUT THE INVENTION

Figure 1:
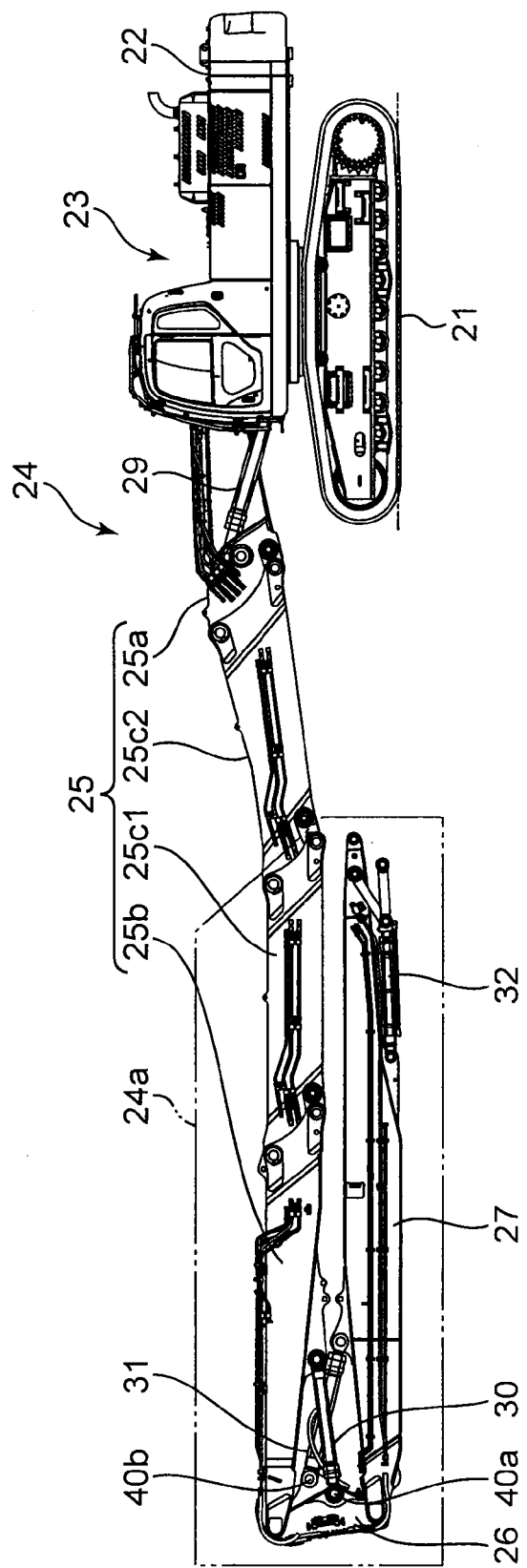
FIG. 1 is a schematic side view of a folded state of a demolition machine with a super long attachment according to an embodiment of a work machine of the present invention.

In the following embodiment, the present invention is applied to a demolition machine with a super long attachment as one embodiment of a work machine of the present invention, together with the explanation in the background art.

The demolition machine according to this embodiment is formed by a base machine 23 and a work attachment 24, as illustrated in FIGS. 1 to 4. The base machine 23 is formed by a lower traveling body 21 of a crawler type and an upper turning body 22. The upper turning body 22 is installed on the lower traveling body 21 to be able to turn about a vertical axis. The work attachment 24 is mounted to the front of the base machine 23.

The work attachment 24 includes a boom 25, a short interboom 26, an arm 27, and a work device (not illustrated). The boom 25 is liftably mounted to the base machine 23, specifically to the upper turning body 22. The boom 25 is formed by a main boom 25a, a front boom 25b, and insert booms 25c1 and 25c2. The interboom 26 is mounted to a tip end portion 25b2 of the front boom 25b to be able to rotate vertically. The arm 27 is mounted to the tip end of the interboom 26 so that its rear end portion 27b is able to rotate vertically. The work device (not illustrated) is mounted to the tip end portion of the arm 27. A nibbler or the like, for example, is employed as the work device.

In addition, a boom cylinder 29 that lifts the boom 25 and the entire attachment including the boom 25, interboom cylinders 30 that operate the interboom 26, an arm cylinder 31 that operates the arm 27, and a work device cylinder 32 that operates the work device (not illustrated) are provided to the work attachment 24, as cylinders to operate the work attachment 24.

Further, the interboom cylinders 30 and the arm cylinder 31 are rotatably connected by mounting pins 40a to 40d that will be described later, between the boom 25 (the front boom 25b, specifically) and the interboom 26, and between the interboom 26 and the arm 27, respectively, on the ventral surface side of the attachment (that is, on the side that faces toward the front of the base machine 23 when the attachment is extended and raised).

Figure 2:
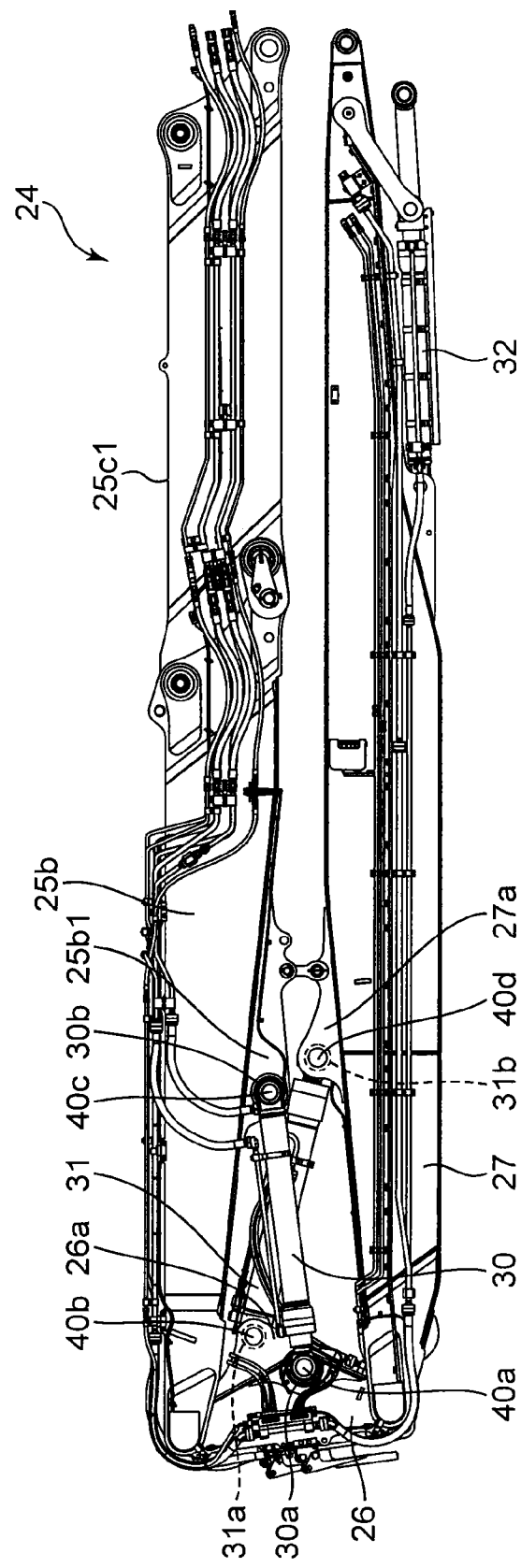
FIG. 2 is a side view of the folded state of a work attachment of FIG. 1.

Furthermore, when the work attachment 24 is folded for transportation, as illustrated in FIGS. 1 to 2, the work attachment 24 is triple-folded and put on the ground so that the boom 25 is arranged on the upper side of the interboom 26 and the arm 27 is arranged on the lower side of the interboom 26, separated into a group of the base machine 23 and the main boom 25a, a group of the work attachment 24a except for the main boom 25a and the insert boom 25c2, and the insert boom 25c2, transported, and assembled into the same state after the transportation.

Figure 3:
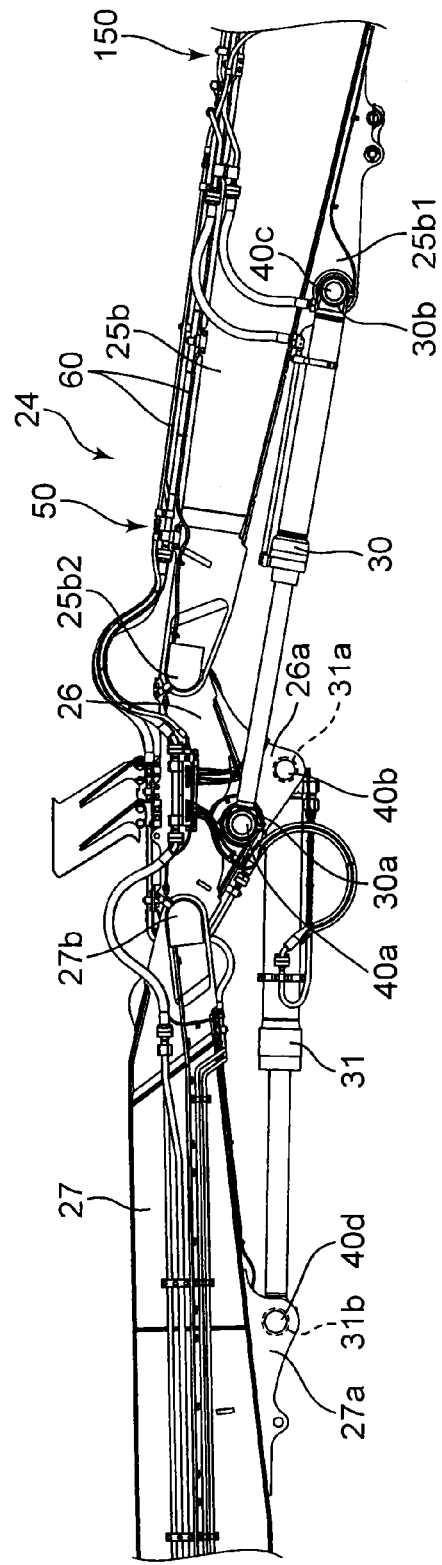
FIG. 3 is an enlarged side view of an interboom and its vicinity when the work attachment of FIG. 1 is in an extended state.
Figure 4:
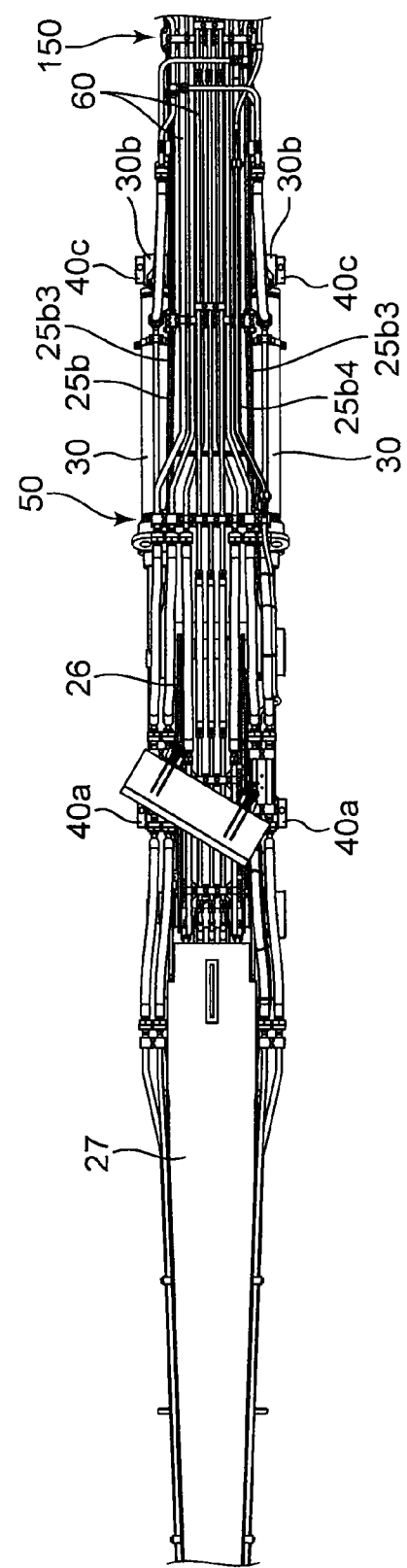
FIG. 4 is an enlarged plan view of the interboom and its vicinity when the work attachment of FIG. 1 is in the extended state.
Figure 5:
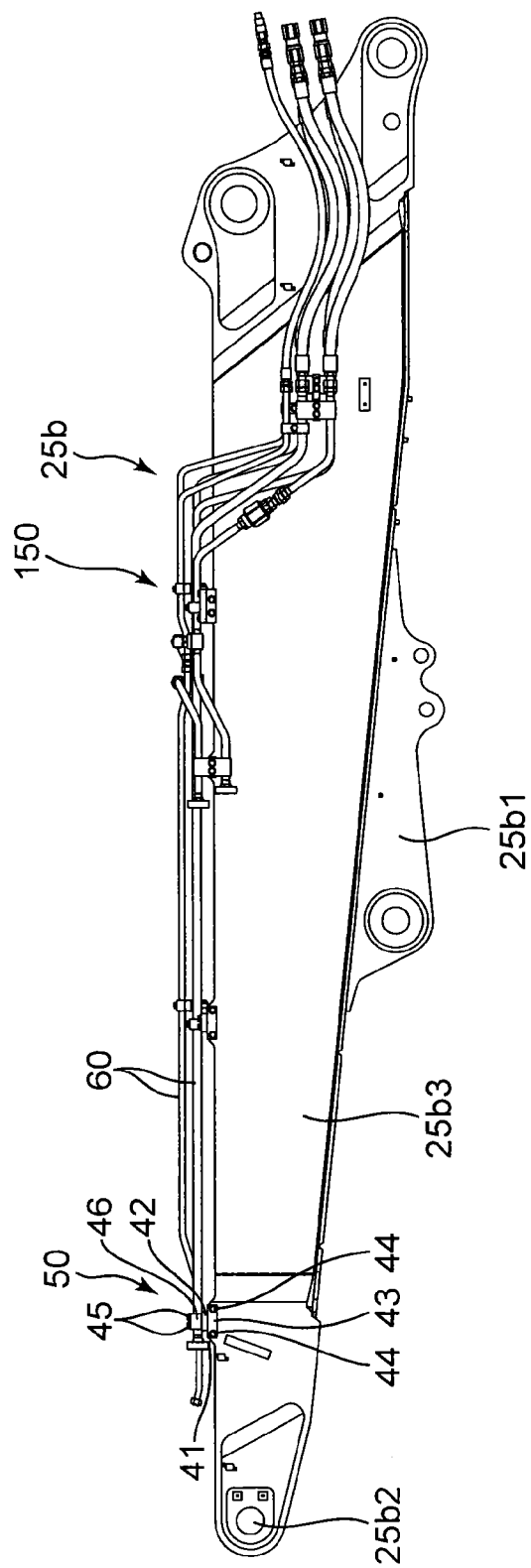
FIG. 5 is a side view of a front boom of FIG. 1.

As illustrated in FIG. 3 and FIG. 4, the two interboom cylinders 30 are separated from each other in the width direction of the interboom 26, and connected to the interboom 26 by the first mounting pins 40a that will be described later. Moreover, the one arm cylinder 31 is sandwiched by the two interboom cylinders 30, and connected to a protruding portion 26a (refer to FIG. 3) of the interboom 26 by the second mounting pin 40b that will be described later.

As illustrated in FIGS. 1 to 4, the first mounting pin 40a connects one end portion 30a of the interboom cylinder 30 to the interboom 26 to be able to rotate about a horizontal axis.

The second mounting pin 40b connects one end portion 31a of the arm cylinder 31 to the protruding portion 26a that protrudes downwardly from the position closer to the rear (the right side in FIG. 3) of the interboom 26 to be able to rotate about a horizontal axis.

The third mounting pin 40c connects another end portion 30b of the interboom cylinder 30 to a mounting portion 25b1 that protrudes from the peripheral surface of the front boom 25b to be able to rotate about a horizontal axis.

The fourth mounting pin 40d connects another end portion 31b of the arm cylinder 31 to a mounting portion 27a that protrudes from the peripheral surface of the arm 27 to be able to rotate about a horizontal axis.

When the work attachment 24 is in an attachment-folded state in the triple-folded manner, in which the front boom 25b is on the upper side and the arm 27 is on the lower side with the interboom 26 therebetween, as illustrated in FIGS. 1 to 2, the second mounting pin 40b is arranged on the upper side of the first mounting pin 40a, and the interboom cylinder 30 and the arm cylinder 31 are arranged to cross each other, when viewed from the side surface of the attachment.

Next, mounting structures of pipes 60 to the front boom 25b, the interboom 26, and the main boom 25a in the demolition machine according to this embodiment will be explained in order.

(Explanation about Mounting Units 50 and 150 of the Pipes 60 on the Front Boom 25b)

<Mounting Unit 50>

As illustrated in FIGS. 4 to 8, the front boom 25b is provided with an upper plate 25b4, a lower plate (not illustrated) that is arranged separatingly from the upper plate 25b4 in the downward direction, and a pair of side plates 25b3 that is arranged on the both sides in the width direction of the upper plate 25b4. Both side edge portions of the upper plate 25b4 and the lower plate (not illustrated) are welded to the pair of side plates 25b3, so as to form a tubular front boom body. Above the upper plate 25b4 of the front boom 25b, many pipes 60 are mounted by a plurality of mounting units 50 and 150. The pipes 60 are used to guide a hydraulic oil to the arm cylinder 31 that drives the arm 27, the work device cylinder 32 that rotates the work device at the tip end of the arm 27, a driving cylinder that drives the work device such as the nibbler, and the like. Incidentally, the upper plate 25b4, the lower plate (not illustrated), and the pair of side plates 25b3 may be provided at least at the portion where the pipes 60 are mounted (mounting portion) in the front boom 25b.

As illustrated in FIGS. 4 to 8, the mounting unit 50 of the pipes 60 that is on the side closer to the tip end 25b2 of the front boom 25b is provided with a pair of protruding portions 41, a bridge member 42, and connecting portions.

The pair of protruding portions 41 is formed on the both sides in the width direction of the upper plate 25b4 by outwardly protruding the end portions of the side plates 25b3 of the front boom 25b. Specifically, the upper end edges of the pair of side plates 25b3 protrude above the upper plate 25b4, so as to form the protruding portions 41.

The bridge member 42 extends along the width direction of the upper plate 25b4 and is bridged between the pair of protruding portions 41. The bridge member 42 is formed by a long steel sheet or the like.

On the upper surface of the bridge member 42, a bracket 46 that is at the position closer to the protruding portion 41 is fixed by two second connecting bolts 45 that will be described later, and the two pipes 60 are fixed between the bracket 46 and the bridge member 42. Similarly, other brackets 47 and 48 are fixed onto the upper surface of the bridge member 42 by bolts 49, and thus, other pipes 60 are fixed between the brackets 47 and 48 and the bridge member 42.

The connecting portion attachably and detachably connects the protruding portion 41 and the end portion of the bridge member 42. The connecting portion of the mounting unit 50 includes a fixing portion 43, two first connecting bolts 44 and the two second connecting bolts 45.

The fixing portion 43 is a block that is made of steel or the like and has a cuboid shape, and interposes between the protruding portion 41 and the bridge member 42. The side surface of the fixing portion 43 abuts against the outer-side side surface of the protruding portion 41. The upper surface of the fixing portion 43 abuts against the lower surface of the bridge member 42 at the position where the bridge member 42 extends outside the protruding portion 41. Incidentally, a vibration-proof member such as a rubber sheet may lie between the fixing portion 43 and the protruding portion 41, or between the fixing portion 43 and the bridge member.

The two first connecting bolts 44, corresponding to a first connecting portion of the present invention, connect the protruding portion 41 and the fixing portion 43 attachably and detachably. Each of the first connecting bolts 44 penetrates through the fixing portion 43 and the protruding portion 41 continuously, and is screwed to a nut 51 on the inner side of the protruding portion 41, so as to fasten the fixing portion 43 and the protruding portion 41. As the two first connecting bolts 44 are arranged in nearly parallel with the extending direction of the pipes 60, it is possible to avoid the trouble that the fixing portion 43 rotates relative to the protruding portion 41 and is displaced.

The second connecting bolts 45, corresponding to a second connecting portion of the present invention, connect the fixing portion 43 and the bridge member 42 attachably and detachably. Each of the second connecting bolts 45 penetrates through the bracket 46 and the bridge member 42 continuously, and is screwed in a female screw hole formed vertically in the fixing portion 43, so as to fasten the bracket 46, the bridge member 42, and the fixing portion 43.

The plurality of pipes 60 are fixed to the bridge member 42 by the brackets 46 to 48 so as to extend along the longitudinal direction of the front boom 25b while leaving spaces therebetween.

<Mounting Unit 150>

As illustrated in FIGS. 4 to 5 and FIGS. 9 to 11, the mounting unit 150 of the pipes 60 that is on the root side of the front boom 25b (the right side in FIG. 5) has the configuration almost the same as that of the mounting unit 50, and is provided with a pair of protruding portions 141, a bridge member 142, and connecting portions.

The pair of protruding portions 141 is formed on the both sides in the width direction of the upper plate 25b4 by outwardly protruding the end portions of the side plates 25b3 of the front boom 25b. Specifically, the upper end edges of the pair of side plates 25b3 protrude above the upper plate 25b4, so as to form the protruding portions 141.

The bridge member 142 extends along the width direction of the upper plate 25b4 and is bridged between the pair of protruding portions 141. The bridge member 142 is formed by the long steel sheet or the like.

On the upper surface of the bridge member 142, a bracket 146 is fixed onto the upper surface of the bridge member 142 by bolts 149, and the many pipes 60 are fixed between the bracket 146 and the bridge member 142.

The connecting portion connects the protruding portion 141 and the end portion of the bridge member 142 attachably and detachably. The connecting portion of the mounting unit 150 is provided with a fixing portion 143, two first connecting bolts 144 and two second connecting bolts 145.

The fixing portion 143 is the block that is made of steel or the like and has the cuboid shape, and interposes between the protruding portion 141 and the bridge member 142. The side surface of the fixing portion 143 abuts against the outer-side side surface of the protruding portion 141. The upper surface of the fixing portion 143 abuts against the lower surface of the bridge member 142 at the position where the bridge member 142 extends outside the protruding portion 141.

The two first connecting bolts 144, corresponding to the first connecting portion of the present invention, connect the protruding portion 141 and the fixing portion 143 attachably and detachably. Each of the first connecting bolts 144 penetrates through the fixing portion 143 and the protruding portion 141 continuously, and is screwed to a nut 151 on the inner side of the protruding portion 141, so as to fasten the fixing portion 143 and the protruding portion 141. As the two first connecting bolts 144 are arranged in nearly parallel with the extending direction of the pipes 60, it is possible to avoid the trouble that the fixing portion 143 rotates relative to the protruding portion 141 and is displaced.

It should be noted that, when the mounting units 50 and 150 that fix the pipes 60 are provided at a plurality of points along the extending direction of the pipes 60, as in the front boom 25b according to this embodiment, the rotation of the fixing portions 43 and 143 is limited by the pipes 60 extending to the adjacent mounting units 50 and 150, even though there are the one first connecting bolt 44 and the one first connecting bolt 144 arranged on each side of the front boom 25b.

The two second connecting bolts 145, corresponding to the second connecting portion of the present invention, connect the fixing portion 143 and the bridge member 142 attachably and detachably. Each of the second connecting bolts 145 penetrates through the bridge member 142 continuously, and is screwed in a female screw hole formed vertically in the fixing portion 143, so as to fasten the bridge member 142 and the fixing portion 143.

The plurality of pipes 60 are fixed to the bridge member 142 by the bracket 146 so as to extend along the longitudinal direction of the front boom 25b while leaving the spaces therebetween. The bracket 146 is fixed to the upper surface of the bridge member 142 by the bolts 149. Thereby, the pipes 60 are fixed between the bracket 146 and the bridge member 142.

In addition, an extension bracket 147 and a press bracket 148 are provided in the mounting unit 150, so as to fix other pipes 60 above the bracket 146. The extension bracket 147 has a long leg portion extending downwardly, and is fixed by a bolt 152 to the side surface of the bridge member 142 (the surface facing right in FIG. 9), near the lower end of the leg portion. The press bracket 148 is fixed to the upper surface of the extension bracket 147 by the bolt 149, so that the pipes 60 are sandwiched and fixed between the brackets 147 and 148 at the position higher than the bracket 146.

Incidentally, the extension bracket 147 may be welded and fixed to the bridge member 142.

<Characteristics of the Mounting Units 50 and 150>

According to thus-structured mounting units 50 and 150 for mounting the pipes 60 onto the front boom 25b, the end portions of the bridge members 42 and 142 are attachably and detachably connected by the connecting portions (specifically, the fixing portions 43 and 143, the first connecting bolts 44 and 144, and the second connecting bolts 45 and 145) to the plurality of pairs of protruding portions 41 and 141 that are formed by the end portions of the side plates 25b3 of the front boom 25b protruding upwardly on the both sides in the width direction of the upper plate 25b4, and the many pipes 60 are fixed to the bridge members 42 and 142.

This eliminates the need for the conventional welding portion for welding the block or the like for fixing the pipes to the upper plate 25b4 of the front boom 25b or the like. Thus, it is possible to avoid the possibility of cracks in the upper plate 25b4 and the like, and to reduce the weight of the front boom 25b by reducing the thickness of the upper plate 25b4 and the like.

As the protruding portions 41 and 141 protrude outside the tubular portion of the front boom 25b that is formed by the upper plate 25b4, the lower plate, and the side plates 25b3 on the both sides, the protruding portions 41 and 141 are located outside the region where a bending load and bending stress are applied in the front boom 25b (where the so-called line of stress passes), at the time of using the demolition machine. As the bending stress and vibration that the tubular portion receives are hardly transmitted to the protruding portions 41 and 141, it is less likely that the bridge members 42 and 142 fall off from the protruding portions 41 and 141, even though the end portions of the bridge members 42 and 142 are attachably and detachably connected to the protruding portions 41 and 141 by the connecting portions.

Further, the plurality of pipes 60 are fixed to the bridge members 42 and 142 that are bridged at least between the pairs of the protruding portions 41 and 141 and that extend along the width direction of the upper plate 25b4, and therefore, the many pipes 60 can be arranged and fixed in the width direction of the front boom 25b. Thus, it is possible to stably fix the many necessary pipes 60 to the long attachment and the like.

Furthermore, as the bridge members 42 and 142 are fixed to the fixing portions 43 and 143 outside the side plates 25b3 in such a manner as to slightly project from the both sides of the front boom 25b, it is possible to fix the pipes 60 in the area wider than the width of the front boom 25b.

Incidentally, each of the protruding portions 41 and 141 may have the one through hole, through which each of the first connecting bolts 44 and 144 passes, on each side, but may preferably have the two or more through holes. When there is the one through hole, the bridge members 42 and 142 and the fixing portions 43 and 143 rotate about the one bolt 44 and the one bolt 144, each of which is inserted in the through hole, but the fixed pipes 60 can serve as whirl-stop, as similar fixing parts are usually present at a plurality of positions in the longitudinal direction. However, in view of assemblability, it is preferable that there are the two or more through holes on each side. In this case, mounting operation of the pipes 60 is facilitated when the bridge members 42 and 142 are fixed before mounting the pipes 60.

Further, the fixing portions 43 and 143 lie between the protruding portions 41 and 141 and the bridge members 42 and 142, and the fixing portions 43 and 143 and the protruding portions 41 and 141 are attachably and detachably connected by the first connecting bolts 44 and 144, which makes it easy to mount the bridge members 42 and 142 to the protruding portions 41 and 141.

The protruding portions 41 and 141, to which the bridge members 42 and 142 are mounted respectively, may not be precisely arranged at the predetermined positions, due to welding deformation and assembly errors in the tubular portion of the front boom 25b, and in this case, it may be difficult to mount the bridge members 42 and 142. For this reason, the fixing portions 43 and 143 are allowed to lie between the protruding portions 41 and 141 and the bridge members 42 and 142, so that manufacturing errors in the tubular portion of the front boom 25b can be absorbed by the fixing portions 43 and 143 lying between the protruding portions 41 and 141 and the bridge members 42 and 142. This facilitates the mounting of the bridge members 42 and 142 to the protruding portions 41 and 141.

Further, at the time of changing the type or the number of the pipes 60 to be mounted to the front boom 25b, the bridge members 42 and 142, whose length corresponds to the change, are prepared and connected to the existing protruding portions 41 and 141 via the fixing portions 43 and 143, so that the new pipes 60 can be mounted with ease, without changing the front boom 25b side. In other words, the various pipes 60 can be mounted by changing a pitch of the mounting holes for the second connecting bolts 45 at the both ends of the bridge members 42 and 142.

Furthermore, as the plurality of the pipes 60 can be attached to and detached from the front boom 25b while the plurality of the pipes 60 are fixed to the bridge members 42 and 142, it is possible to remove the pipes easily at the time of repairs of the front boom 25b and the like.

Further, according to the mounting units 50 and 150, the fixing portions 43 and 143 are attachably and detachably connected to the bridge members 42 and 142 by the second connecting bolts 45 and 145, and therefore, it is possible to easily change the fixing portions 43 and 143 corresponding to the shapes of the protruding portions 41 and 141 or the bridge members 42 and 142. This makes it possible to improve versatility of the bridge members 42 and 142.

Further, according to the mounting units 50 and 150, the end portions of the bridge members 42 and 142 can be attachably and detachably connected to the protruding portions 41 and 141 that are formed by the upper end edges of the pair of side plates 25b3 of the front boom 25b protruding upward beyond the upper plate 25b4, by the connecting portions, and therefore, it is possible to stably fix the bridge members 42 and 142 and the many pipes 60 fixed thereto to the side plates 25b3 on the both sides of the front boom 25b, without receiving the stress applied to the tubular portion of the front boom 25b.

(Explanation about a Mounting Unit 250 of the Pipes 60 on the Interboom 26)

Similarly to the front boom 25b, the interboom 26 is provided with an upper plate 26c, a lower plate (not illustrated) that is arranged separatingly from the upper plate 26c in the downward direction, and a pair of side plates 26b that is arranged on the both sides in the width direction of the upper plate 26c, as illustrated in FIGS. 12 to 15. Both side edge portions of the upper plate 26c and the lower plate are welded to the pair of side plates 26b, so as to form a tubular interboom body. Above the upper plate 26c of the interboom 26, the many pipes 60 are mounted by a plurality of mounting units 250. The pipes 60 are used to guide the hydraulic oil to the arm cylinder 31 that drives the arm 27, the work device cylinder 32 that rotates the work device at the tip end of the arm 27, the driving cylinder that drives the work device such as the nibbler, and the like. Incidentally, the upper plate 26c, the lower plate (not illustrated), and the pair of side plates 26b may be provided at least at the portion where the pipes 60 are mounted (mounting portion) in the interboom 26.

The mounting unit 250 of the pipes 60 that is on the tip end side of the interboom 26 (the left side in FIG. 12) is provided with a pair of protruding portions 241, a bridge member 242, and connecting portions.

The pair of protruding portions 241 is formed by upper end edges of the pair of side plates 26b protruding upward beyond the upper plate 26c.

The bridge member 242 extends along the width direction of the upper plate 26c and is bridged between the pair of protruding portions 241. The bridge member 242 is formed by the long steel sheet or the like.

On the upper surface of the bridge member 242, brackets 246 and 247 are fixed to the upper surface of the bridge member 242 by bolts 249, and thus the pipes 60 are fixed between the brackets 246 and 247 and the bridge member 242.

The connecting portion attachably and detachably connects the protruding portion 241 and the end portion of the bridge member 242. The connecting portion of the mounting unit 250 is provided with a fixing portion 243, two first connecting bolts 244 and two second connecting bolts 245.

The fixing portion 243 is the block that is made of steel or the like and has the cuboid shape, and interposes between the protruding portion 241 and the bridge member 242. The side surface of the fixing portion 243 abuts against the inner-side side surface of the protruding portion 241. The upper surface of the fixing portion 243 abuts against the lower surface of the bridge member 242.

The two first connecting bolts 244, corresponding to the first connecting portion of the present invention, connect the protruding portion 241 and the fixing portion 243 attachably and detachably. Each of the first connecting bolts 244 penetrates through the protruding portion 241 and the fixing portion 243 continuously, and is screwed to a female screw hole formed in the fixing portion 243 inside the protruding portion 241, so as to fasten the fixing portion 243 and the protruding portion 241. As the two first connecting bolts 244 are arranged in nearly parallel with the extending direction of the pipes 60, it is possible to avoid the trouble that the fixing portion 243 rotates relative to the protruding portion 241 and is displaced.

The two second connecting bolts 245, corresponding to the second connecting portion of the present invention, connect the fixing portion 243 and the bridge member 242 attachably and detachably. Each of the second connecting bolts 245 penetrates through the bridge member 242, and is screwed in a female screw hole formed vertically in the fixing portion 243, so as to fasten the bridge member 242 and the fixing portion 243.

The plurality of pipes 60 are fixed to the bridge member 242 by the brackets 246 and 247 so as to extend along the longitudinal direction of the interboom 26 while leaving the spaces therebetween.

As the welding portion to be welded to the upper plate 26c of the interboom 26 or the like is not needed in thus-structured mounting unit 250 for mounting the pipes 60 to the interboom 26, similarly to the mounting units 50 and 150, it is possible to avoid the possibility of cracks in the upper plate 26c and the like, and to reduce the weight of the interboom 26 by reducing the thickness of the upper plate 26c and the like.

In addition, the protruding portions 241 of the interboom 26 protrude outside the tubular portion forming the interboom 26, and are located outside the region where the line of stress passes. Therefore, the bending stress and the vibration that the tubular portion receives are hardly transmitted to the protruding portions 241. For this reason, it is less likely that the bridge member 242 falls off from the protruding portions 241, even though the end portions of the bridge member 242 are attachably and detachably connected to the protruding portions 241 by the connecting portions.

Further, the plurality of pipes 60 are fixed to the bridge member 242 that is bridged at least between the pair of the protruding portions 241 and that extends along the width direction of the upper plate 26c, and therefore, the many pipes can be arranged and fixed in the width direction of the interboom 26. Thus, it is possible to stably fix the many necessary pipes 60 to the long attachment and the like.

(Explanation about a Mounting Unit 350 of the Pipes 60 on the Main Boom 25a)

Similarly to the front boom 25b, the main boom 25a is provided with an upper plate 25a2, a lower plate (not illustrated) that is arranged separatingly from the upper plate 25a2 in the downward direction, and a pair of side plates 25a1 that is arranged on the both sides in the width direction of the upper plate 25a2, as illustrated in FIGS. 16 to 19. With the main boom 25a, however, the upper end edges and the lower end edges of the pair of side plates 25a1 are welded to the upper plate 25a2 and the lower plate, respectively, so as to form a tubular main boom body, which is different from the front boom 25b.

Above the upper plate 25a2 of the main boom 25a, the many pipes 60 are mounted by a mounting unit 350. The pipes 60 are used to guide the hydraulic oil to the interboom cylinders 30 that drive the interboom 26, the arm cylinder 31 that drives the arm 27, the work device cylinder 32 that rotates the work device at the tip end of the arm 27, the driving cylinder that drives the work device such as the nibbler, and the like. Incidentally, the upper plate 25a2, the lower plate (not illustrated), and the pair of side plates 25a1 may be provided at least at the portion where the pipes 60 are mounted (mounting portion) in the main boom 25a.

The mounting unit 350 of the pipes 60 that is near an intermediate position of the main boom 25a is provided with a pair of protruding portions 341, a bridge member 342, and connecting portions.

The pair of protruding portions 341 is formed by the both side edges of the upper plate 25a2 protruding outside the side plates 25a1 in the width direction of the upper plate.

The bridge member 342 extends along the width direction of the upper plate 25a2 and is bridged between the pair of protruding portions 341. The bridge member 342 is formed by the long steel sheet or the like.

On the upper surface of the bridge member 342, a brackets 346 is fixed to the upper surface of the bridge member 342 by bolts 349, and thus the pipes 60 are fixed between the bracket 346 and the bridge member 342.

The connecting portions attachably and detachably connect the protruding portions 341 on the both sides of the upper plate 25a2 and the end portions of the bridge member 342. The connecting portion of the mounting unit 350 is provided with a fixing portion 343 and two first connecting bolts 344.

Figure 18:
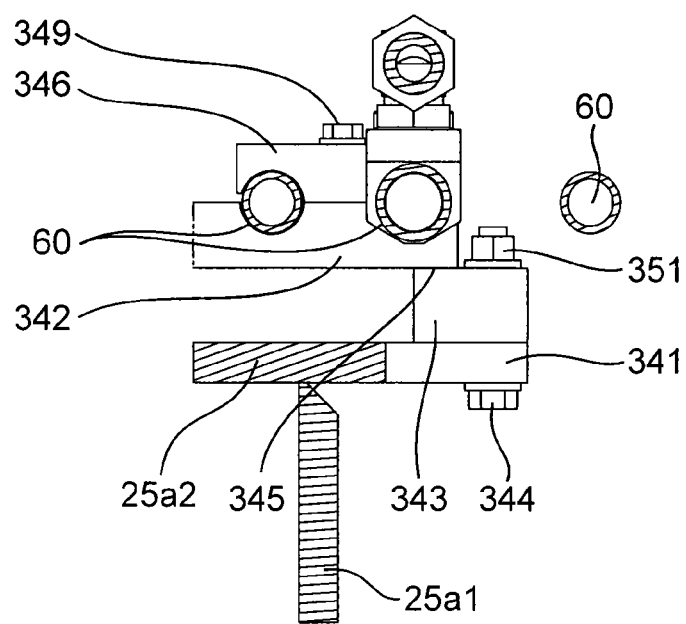
FIG. 18 is a view of the pipe mounting unit on the tip end side of the main boom of FIG. 16, viewed from the tip end side of the main boom.
Figure 19:
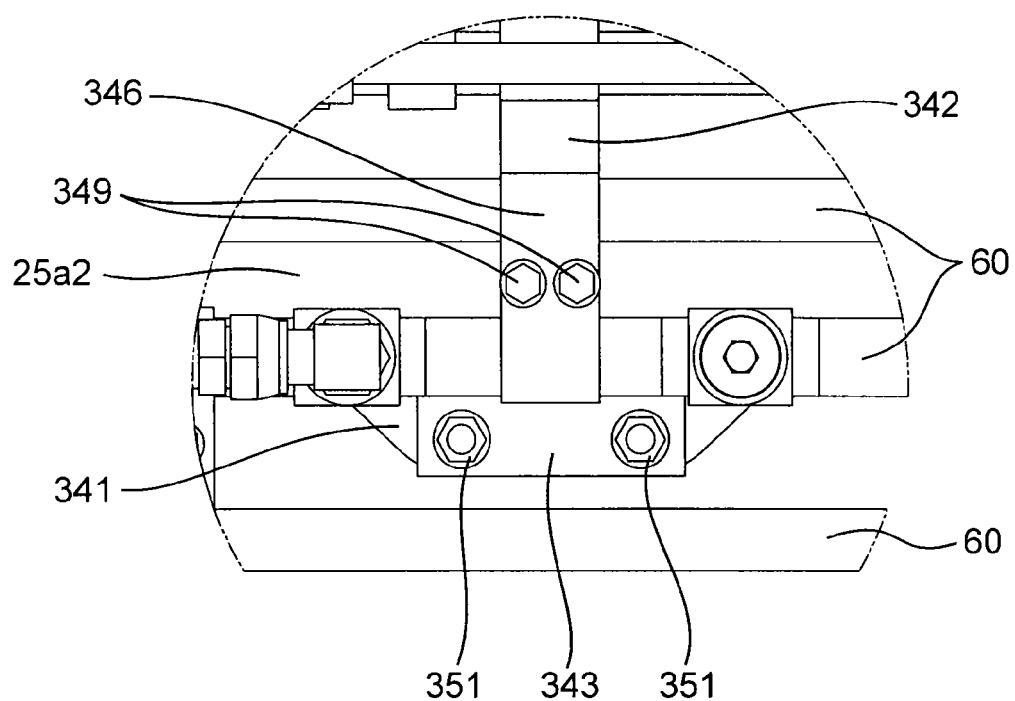
FIG. 19 is an enlarged plan view of the pipe mounting unit on the tip end side of the main boom of FIG. 16.

The fixing portion 343 is the block that is made of steel or the like and has the cuboid shape, and interposes between the protruding portion 341 and the bridge member 342. The lower surface of the fixing portion 343 abuts against the upper surface of the protruding portion 341. The upper surface of the fixing portion 343 is welded and connected to the lower surface of the bridge member 342. FIG. 18 illustrates a welding portion 345 for connecting the fixing portion 343 and the bridge member 342, and the welding portion 345 corresponds to the second connecting portion according to the present invention. It should be noted that the bridge member 342 and the fixing portion 343 may be attachably and detachably connected to each other by fastening means such as the bolts.

The two first connecting bolts 344, corresponding to the first connecting portion of the present invention, connect the protruding portion 341 and the fixing portion 343 attachably and detachably. Each of the first connecting bolts 344 penetrates through the protruding portion 341 and the fixing portion 343 continuously from below, and is screwed to a nut 351 located on the upper side of the fixing portion 343, so as to fasten the fixing portion 343 and the protruding portion 341.

The plurality of pipes 60 are fixed to the bridge member 342 by the bracket 346 so as to extend along the longitudinal direction of the main boom 25a while leaving the spaces therebetween.

The welding portion to be welded to the upper plate 25a2 of the main boom 25a or the like is not needed in thus-structured mounting unit 350 for mounting the pipes 60 to the main boom 25a, similarly to the mounting units 50 and 150, and therefore, it is possible to avoid the possibility of cracks in the upper plate 25a2 and the like, and to reduce the weight of the main boom 25a by reducing the thickness of the upper plate 25a2 and the like.

Further, the end portions of the bridge member 342 can be attachably and detachably connected to the protruding portions 341 formed by the both side edges of the upper plate 25a2 protruding outside the side plates 25a1 in the width direction of the upper plate by the connecting portions, and therefore, it is possible to stably fix the bridge member 342 and the many pipes 60 fixed thereto to the both end edges of the upper plate 25a2 of the main boom 25a, without receiving the stress applied to the tubular portion of the main boom 25a.

Namely, the pair of the protruding portions 341 of the main boom 25a is formed by the both side edges of the upper plate 25a2 protruding outside the side plates 25a1 in the width direction of the upper plate, and therefore, the protruding portions 341 of the main boom 25a protrude outside the tubular portion forming the main boom 25a, and are located outside the region where the line of stress passes. Therefore, the bending stress and the vibration that the tubular portion receives are hardly transmitted to the protruding portions 341. As a result of this, it is less likely that the bridge member 342 falls off from the protruding portions 341, even though the end portions of the bridge member 342 are attachably and detachably connected to the protruding portions 341 by the connecting portions.

Further, the plurality of pipes 60 are fixed to the bridge member 342 that is bridged at least between the pair of the protruding portions 341 and that extends along the width direction of the upper plate 25a2, and therefore, the many pipes can be arranged and fixed in the width direction of the main boom 25a. Thus, it is possible to stably fix the many necessary pipes 60 to the long attachment and the like.

(Modification)

(A)

According to the embodiment, the explanation is given to the structure for mounting the pipes 60 onto the front boom 25b, the interboom 26, and the main boom 25a2, as one example of the pipe mounting structure in the work machine according to the present invention, but the present invention is not limited thereto. The present invention may be applied to structure for mounting the pipes 60 onto the arm 27, as a modification of the present invention. Namely, the present invention can be widely applied to the structure for mounting the pipes 60 onto the booms or the arms.

(B)

According to the embodiment, the structure is illustrated in which the pipes 60 are arranged and mounted onto the upper surface side of the front boom 25b, the interboom 26, and the main boom 25a2 in the width direction, but the present invention is not limited thereto.

As a modification of the present invention, such a structure may be employed that the pipes 60 are mounted via at least one pair of protruding portions and the bridge member bridged between the protruding portions, the protruding portions being formed by outwardly protruding the end portions of the upper plate, the lower plate, or the side plates on the both sides, on the side surface side or the lower surface side of the front boom 25*b*, the interboom 26, the main boom 25*a*2 or the arm 27. In this case, the arm or the booms may have the lightweighted structure, and at the same time, the many pipes can be stably mounted to the arm or the booms, similarly to the embodiment.

When, for example, the bridge member is mounted to the side surface side of the front boom 25*b* or the like, the end portions of the upper plate and the lower plate of the front boom 25*b* are respectively protruded in the width direction so as to form one pair of protruding portions, or the end portions of the side plates are respectively protruded vertically so as to form one pair of protruding portions, and the bridge member may be bridged between the pair of protruding portions.

Further, when the bridge member is mounted to the lower surface side of the front boom 25*b* or the like, the end portions on the both sides of the lower plate of the front boom 25*b* are respectively protruded in the width direction so as to form one pair of protruding portions, or the end portions of the side plates on the both sides are respectively protruded downwardly so as to form one pair of protruding portions, and the bridge member may be bridged between the pair of protruding portions.

(C)

Figure 6:
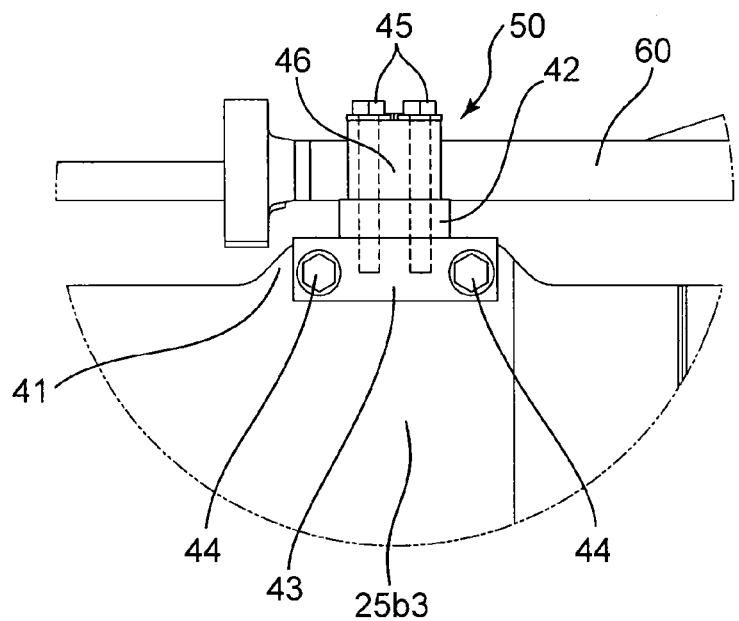
FIG. 6 is an enlarged side view of a pipe mounting unit on the tip end side of the front boom of FIG. 5.
Figure 7:
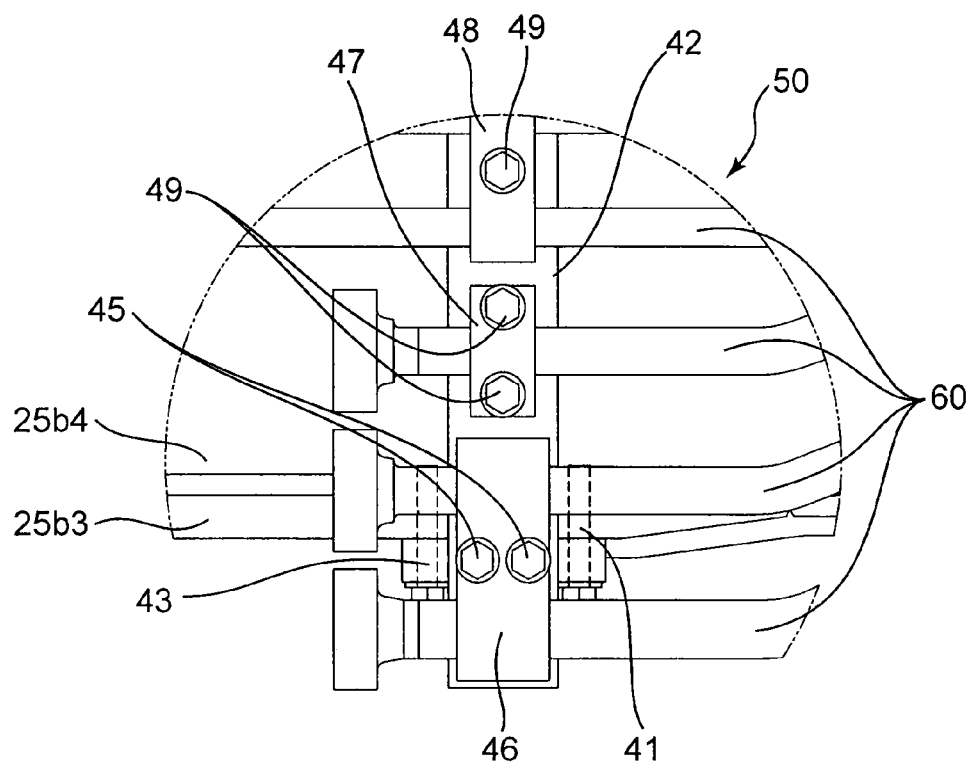
FIG. 7 is an enlarged plan view of the pipe mounting unit on the tip end side of the front boom of FIG. 5.
Figure 8:
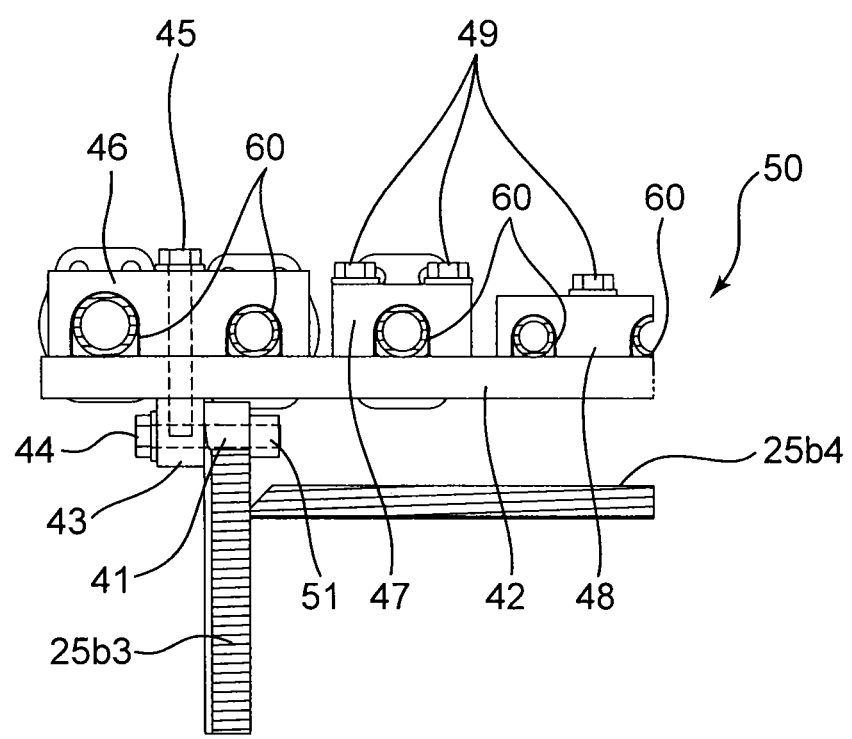
FIG. 8 is a view of the pipe mounting unit on the tip end side of the front boom of FIG. 5, viewed from the root side of the front boom.
Figure 9:
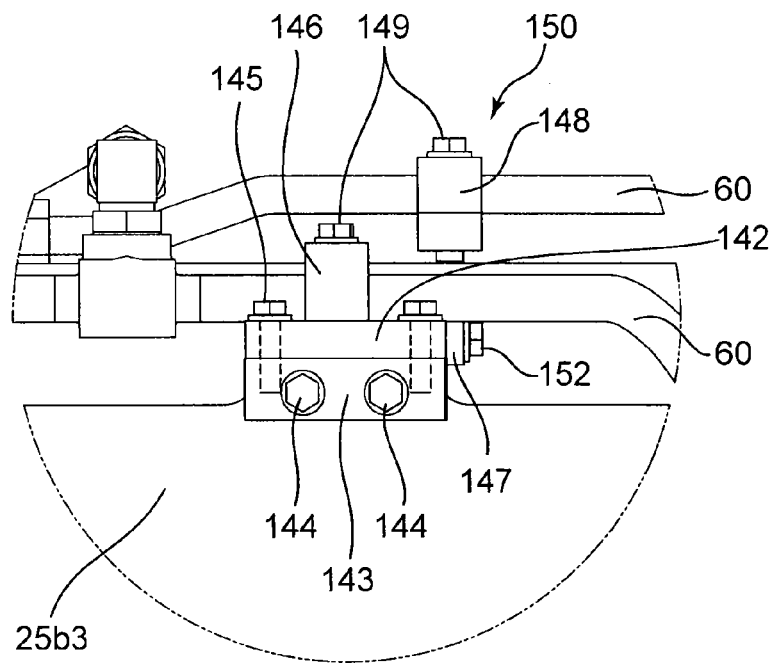
FIG. 9 is an enlarged side view of a pipe mounting unit on the root side of the front boom of FIG. 5.
Figure 10:
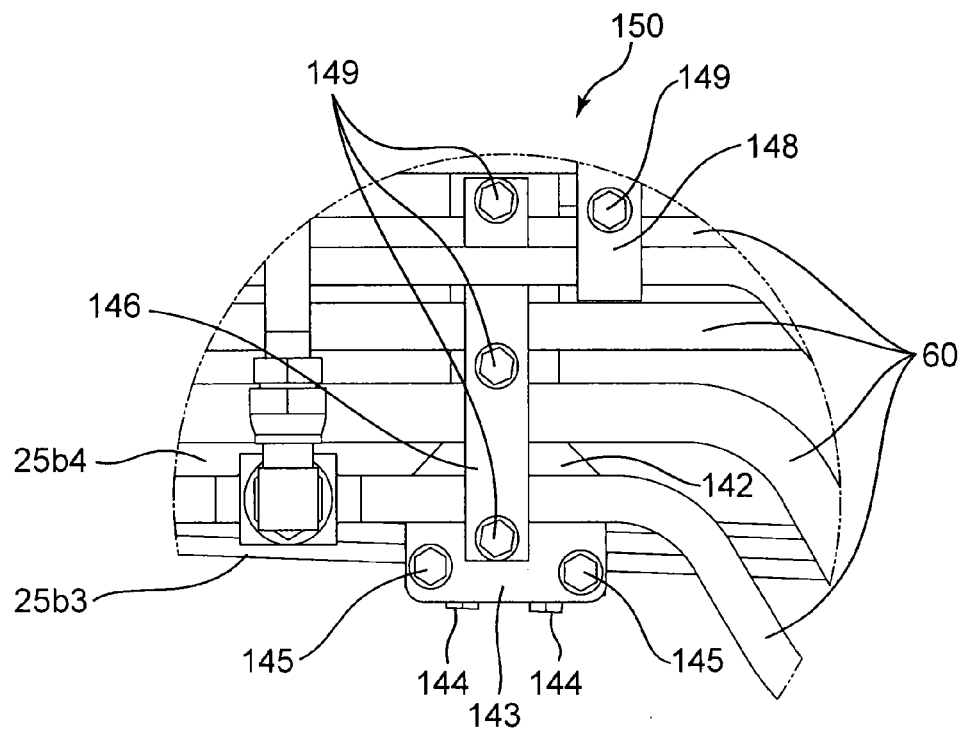
FIG. 10 is an enlarged plan view of the pipe mounting unit on the root side of the front boom of FIG. 5.
Figure 11:
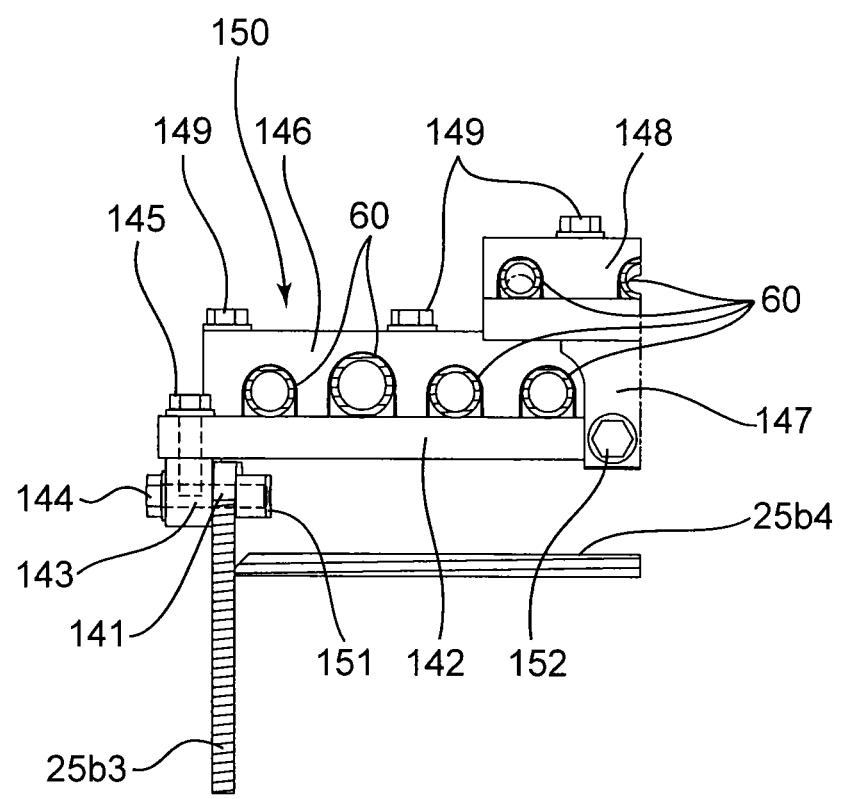
FIG. 11 is a view of the pipe mounting unit on the root side of the front boom of FIG. 5, viewed from the root side of the front boom.
Figure 12:
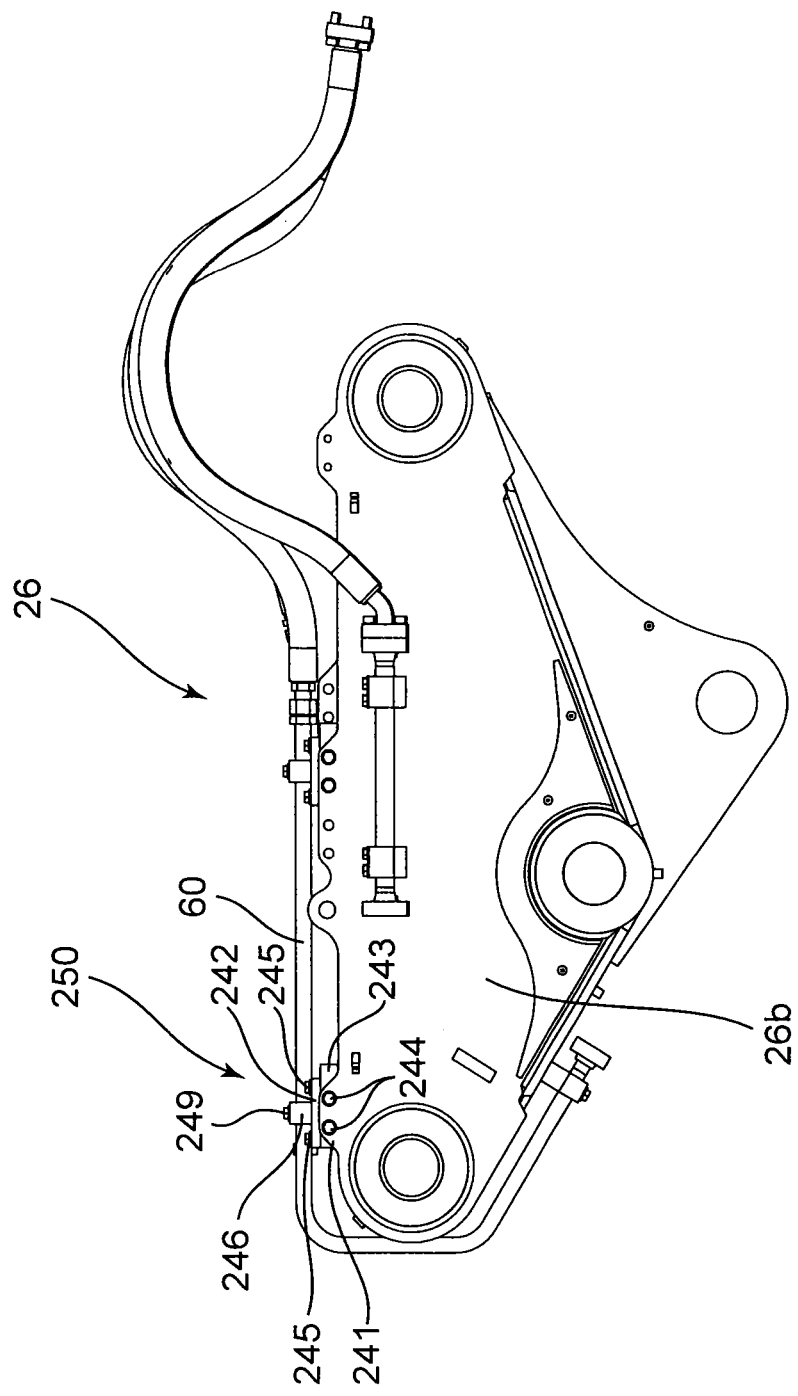
FIG. 12 is a side view of the interboom of FIG. 1.
Figure 13:
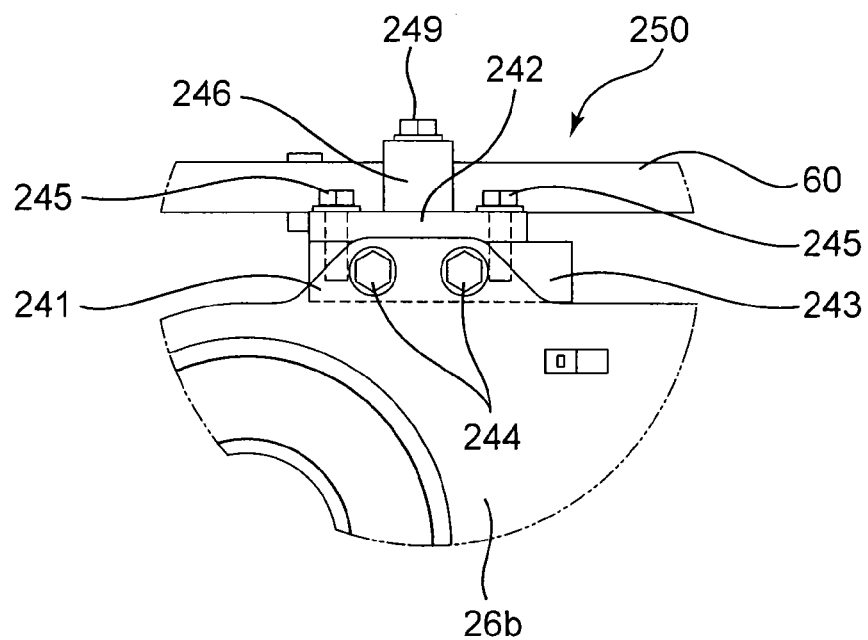
FIG. 13 is an enlarged side view of a pipe mounting unit on the tip end side of the interboom of FIG. 12.
Figure 14:
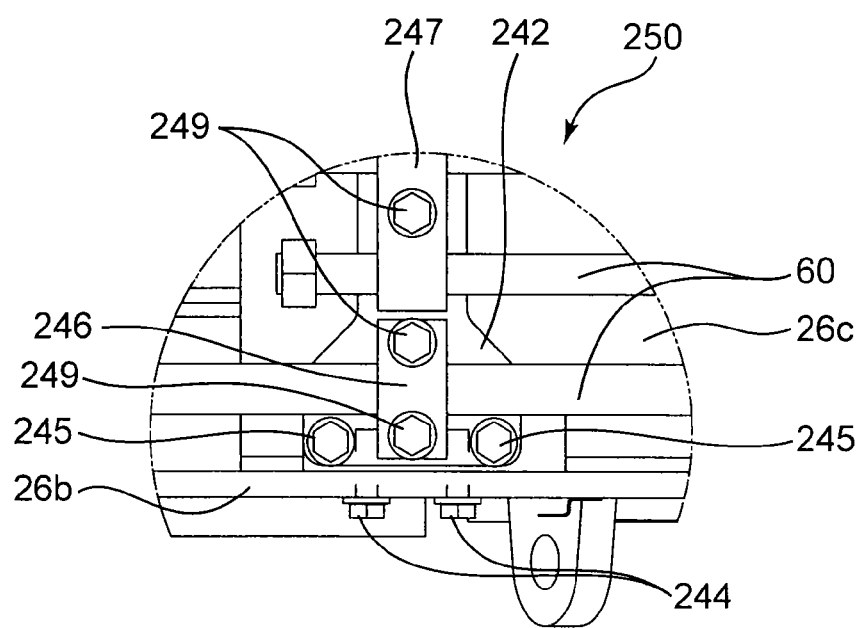
FIG. 14 is an enlarged plan view of the pipe mounting unit on the tip end side of the interboom of FIG. 12.
Figure 15:
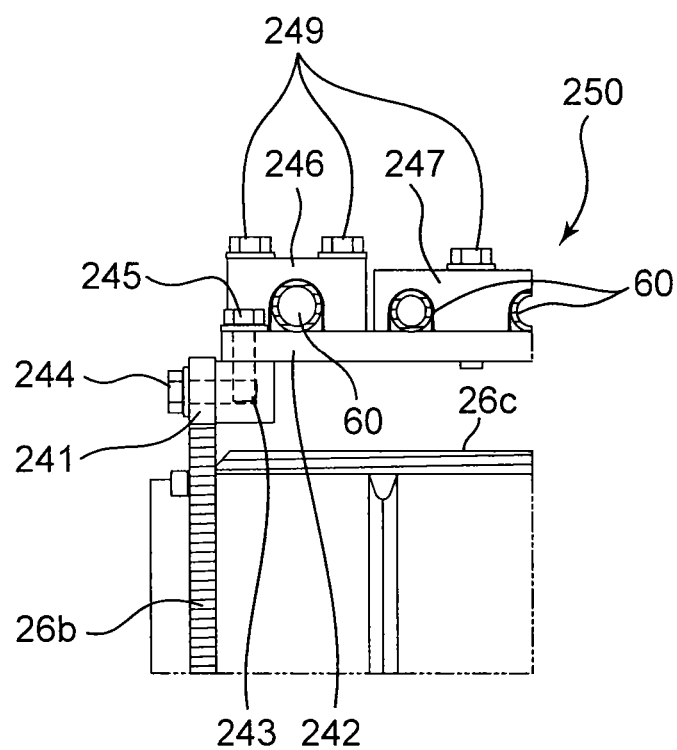
FIG. 15 is a view of the pipe mounting unit on the tip end side of the interboom of FIG. 12, viewed from the root side of the interboom.
Figure 16:
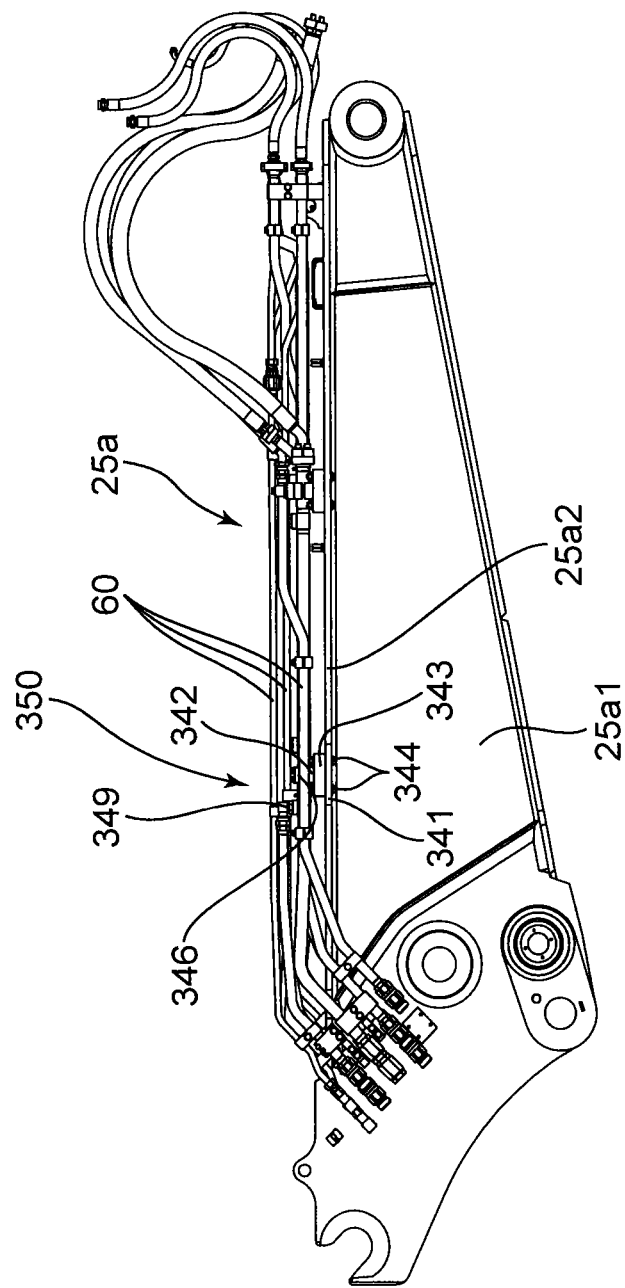
FIG. 16 is a side view of a main boom of FIG. 1.
Figure 17:
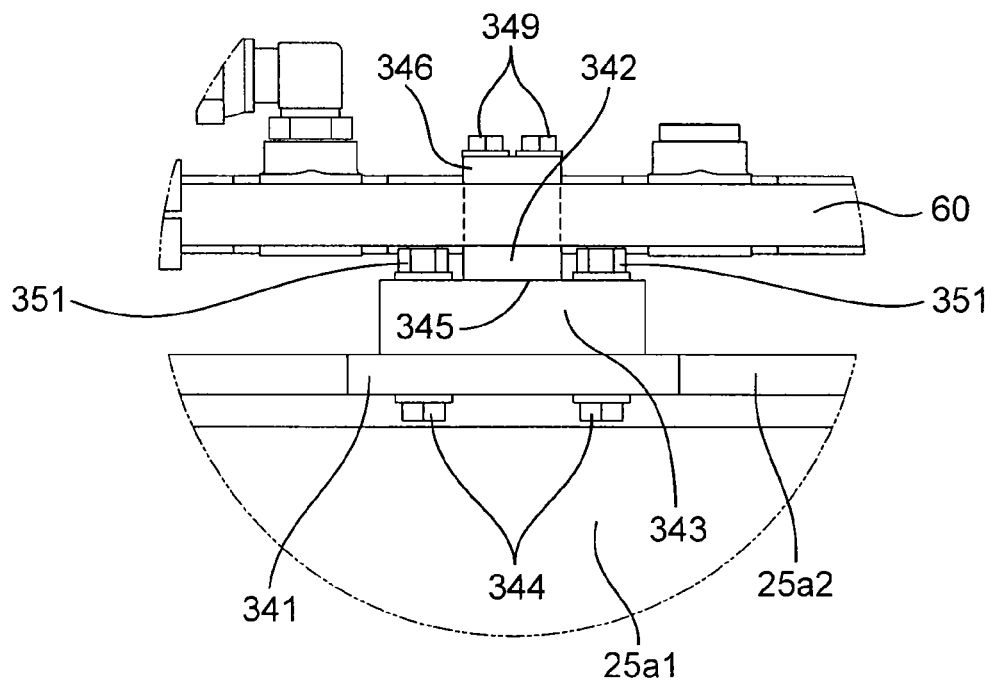
FIG. 17 is an enlarged side view of a pipe mounting unit on the tip end side of the main boom of FIG. 16.

According to the embodiment, the example of mounting the bridge member 42 to the protruding portion 41 via the fixing portion 43 is illustrated in FIGS. 6 to 8 (similarly in FIGS. 9 to 19), but the present invention is not limited thereto. The fixing portion 43 may be omitted, and a flange portion or the like, capable of being fixed to the protruding portion, may be provided at the end portion of the bridge member 42, so that the flange portion or the like may be fixed to the protruding portion 41.

(D)

According to the embodiment, the explanation of the demolition machine is made as one example of the work machine of the present invention, but the present invention is not limited thereto, and the present invention can be widely applied to other work machines such as the one having a lifting magnet mounted at the tip end of the attachment.

Incidentally, the embodiment as described specifically above mainly includes the invention having the following configurations.

A pipe mounting structure of a work machine of the present invention is for mounting a plurality of pipes on an outer peripheral surface of at least one of a boom and an arm of the work machine provided with the boom that is liftably mounted to a base machine, and the arm that is mounted at a tip end of the boom to be able to rotate about a horizontal axis, the pipe mounting structure including: a mounting portion, to which the plurality of pipes are mounted, the mounting portion being provided to at least one of the boom and the arm, and having an upper plate, a lower plate provided at a position separated from the upper plate in a downward direction, and a pair of side plates arranged on both sides in a width direction of the upper plate and the lower plate, end portions of the upper plate, the lower plate or the side plates protruding outwardly to form at least a pair of protruding portions, a bridge member which is bridged between the pair of protruding portions, the plurality of pipes being fixed to the bridge member, and a connecting portion which connects the protruding portions and end portions of the bridge member to each other.

According to this configuration, at least the pair of protruding portions is formed by protruding the end portions of the upper plate, the lower plate or the side plates outwardly, in the portion where the pipes are to be mounted to at least one of the boom and the arm. The end portions of the bridge member are connected to at least the pair of protruding portions by the connecting portions. The plurality of pipes are fixed to the bridge member. This eliminates the need for the conventional welding portion for welding the block or the like for fixing the pipes to the upper plate of the boom or the arm. Thus, it is possible to avoid the possibility of cracks in the upper plate and the like, and to reduce the weight by reducing the thickness of the upper plate and the like.

Further, when the bending load is applied to the boom or the arm while using the work machine, the bending stress or the like is applied to the tubular portion of the boom or the arm, which is formed by the upper plate, the lower plate, and the side plates on the both sides. Meanwhile, as the protruding portions are protruded outside the tubular portion, the bending stress and the vibration that the tubular portion receives are hardly transmitted to the protruding portions. Therefore, it is less likely that the bridge member falls off from the protruding portions, even though the end portions of the bridge member are attachably and detachably connected to the protruding portions by the connecting portions.

Further, the plurality of pipes are fixed to the bridge member that is bridged at least between the pair of the protruding portions, and therefore, the many pipes can be arranged and fixed in the width direction of the boom or the arm, for example. Thus, it is possible to stably fix the many necessary pipes to the long attachment and the like.

It is preferable that the connecting portion includes a fixing portion interposed between each of the protruding portions and the bridge member, a first connecting portion that connects each of the protruding portions and the fixing portion attachably and detachably to each other, and a second connecting portion that connects the fixing portion and the bridge member to each other.

According to this configuration, the fixing portion interposes between the protruding portion and the bridge member, and the fixing portion and the protruding portion are attachably and detachably connected by the first connecting portion, and therefore, it is possible to mount the bridge member to the protruding portion with ease.

The pair of the protruding portions, to which the bridge member is mounted, may not be precisely arranged at the predetermined positions, due to the welding deformation and the assembly errors in the tubular portion of the boom and the arm. In this case, it may be difficult to mount the bridge member. For this reason, the fixing portion is allowed to lie between the protruding portion and the bridge member, so that the manufacturing errors in the tubular portion of the boom and the arm can be absorbed by the fixing portion lying between the protruding portion and the bridge member. This facilitates the mounting of the bridge member to the protruding portions.

Further, at the time of changing the type or the number of the pipes to be mounted to the boom or the arm, the bridge member, whose length corresponds to the change, is prepared and connected to the existing protruding portions via the fixing portions, so that the new pipes can be mounted with ease, without changing the boom and the arm.

Furthermore, as the plurality of the pipes can be attached to and detached from the boom or the arm while the plurality of the pipes are fixed to the bridge member, it is possible to remove the pipes easily at the time of repairs or the like of the boom or the arm.

Further, it is preferable that the second connecting portion connects the fixing portion and the bridge member attachably and detachably to each other.

According to this configuration, the fixing portion is attachably and detachably connected to the bridge member by the second connecting portion, and therefore, it is possible to easily change the fixing portion corresponding to the shape of the protruding portion or the bridge member. This makes it possible to improve versatility of the bridge member.

Further, it is preferable that respective upper end edges of the pair of side plates protrude upward beyond the upper plate to form the protruding portions.

According to this configuration, the end portions of the bridge member can be attachably and detachably connected to the protruding portions that are formed by the upper end edges of the pair of side plates protruding upward beyond the upper plate, by the connecting portions. Further, it is possible to stably fix the bridge member and the many pipes fixed thereto to the side plates on the both sides of the arm or the boom, without receiving the stress applied to the tubular portion of the arm or the boom.

Further, it is preferable that respective both side edges of the upper plate protrude outside the side plates in the width direction of the upper plate to form the protruding portions.

According to this configuration, the end portions of the bridge member can be attachably and detachably connected to the protruding portions formed by the both side edges of the upper plate protruding outside the side plates in the width direction of the upper plate by the connecting portions. Therefore, it is possible to stably fix the bridge member and the many pipes fixed thereto to the both side edges of the upper plate of the arm or the boom, without receiving the stress applied to the tubular portion of the boom or the arm.

EXPLANATION OF REFERENCE NUMERALS 21 lower traveling body
22 upper turning body
23 base machine
24 work attachment
25 boom
25a main boom
25b front boom
25b3 side plate
25b4 upper plate
25c1, 25c2 insert boom
26 interboom
27 arm
41, 141, 241, 341 protruding portion
42, 142, 242, 342 bridge member
43, 143, 243, 343 fixing portion
44, 144, 244, 344 first connecting bolt (first connecting portion)
45, 145, 245 second connecting bolt (second connecting portion)
345 welding portion (second connecting portion)
60 pipe

The invention claimed is:

1. A pipe mounting structure, in a work machine, for mounting a plurality of pipes on an outer peripheral surface of at least one of a boom and an arm of the work machine, one end of the boom is liftably mounted to a base machine as part of the work machine, and the other end of the boom is able to rotate about a horizontal axis, the pipe mounting structure comprising:
a mounting portion, to which the plurality of pipes are mounted, the mounting portion being provided to at least one of the boom and the arm and having an upper plate, a lower plate provided at a position separated from the upper plate in a downward direction, and a pair of first and second side plates arranged on both sides in a width direction of the upper plate and the lower plate, wherein the upper plate, the lower plate, and the pair of first and second side plates form a tubular body, respective upper end edges of the pair of first and second side plates protruding upward beyond the upper plate to form a pair of protruding portions, the pair of protruding portions protruding outwardly from the tubular body;
a bridge member which is bridged between the pair of protruding portions, the plurality of pipes being fixed to the bridge member; and
a connecting portion which connects the protruding portions and end portions of the bridge member to each other.

2. The pipe mounting structure according to claim 1, wherein
the connecting portion comprises:
a fixing portion interposed between each of the protruding portions and the bridge member,
a first connecting portion that connects each of the protruding portions and the fixing portion attachably and detachably to each other, and
a second connecting portion that connects the fixing portion and the bridge member to each other.

3. The pipe mounting structure according to claim 2, wherein
the second connecting portion connects the fixing portion and the bridge member attachably and detachably to each other.

4. A pipe mounting structure, in a work machine, for mounting a plurality of pipes on an outer peripheral surface of at least one of a boom and an arm of the work machine, one end of the boom is liftably mounted to a base machine as a part of the work machine, and the other end of the boom is able to rotate about a horizontal axis, the pipe mounting structure comprising:
a mounting portion, to which the plurality of pipes are mounted, the mounting portion being provided to at least one of the boom and the arm and having an upper plate, a lower plate provided at a position separated from the upper plate in a downward direction, and a pair of first and second side plates arranged on both sides in a width direction of the upper plate and the lower plate, wherein the upper plate, the lower plate, and the pair of first and second side plates form a tubular body, respective both side edges of the upper plate protruding outside the first and second side plates in the width direction of the upper plate to form a pair of protruding portions, the pair of protruding portions protruding outwardly from the tubular body;
a bridge member which is bridged between the pair of protruding portions, the plurality of pipes being fixed to the bridge member; and
a connecting portion which connects the protruding portions and end portions of the bridge member to each other.

5. A pipe mounting structure, in a work machine, for mounting a plurality of pipes on an outer peripheral surface of at least one of a boom and an arm of the work machine, one end of the boom is liftably mounted to a base machine as a part of the work machine, and the other end of the boom is able to rotate about a horizontal axis, the pipe mounting structure comprising:
- a mounting portion, to which the plurality of pipes are mounted, the mounting portion being provided to at least one of the boom and the arm and having an upper plate, a lower plate provided at a position separated from the upper plate in a downward direction, and a pair of first and second side plates arranged on both sides in a width direction of the upper plate and the lower plate, wherein the upper plate, the lower plate, and the pair of first and second side plates form a tubular body, the upper end edge and the lower end edge of the first side plate respectively protruding upward and downward beyond the upper plate and the lower plate to form a pair of protruding portions, the pair of protruding portions protruding outwardly from the tubular body;
- a bridge member which is bridged between the pair of protruding portions, the plurality of pipes being fixed to the bridge member; and
- a connecting portion which connects the protruding portions and end portions of the bridge member to each other.

6. A pipe mounting structure, in a work machine, for mounting a plurality of pipes on an outer peripheral surface of at least one of a boom and an arm of the work machine, one end of the boom is liftably mounted to a base machine as a part of the work machine, and the other end of the boom is able to rotate about a horizontal axis, the pipe mounting structure comprising:
- a mounting portion, to which the plurality of pipes are mounted, the mounting portion being provided to at least one of the boom and the arm and having an upper plate, a lower plate provided at a position separated from the upper plate in a downward direction, and a pair of first and second side plates arranged on both sides in a width direction of the upper plate and the lower plate, wherein the upper plate, the lower plate, and the pair of first and second side plates form a tubular body, the side edge of the upper plate and the side edge of the lower plate respectively protruding in the width direction of the upper plate to form a pair of protruding portions, the pair of protruding portions protruding outwardly from the tubular body;
- a bridge member which is bridged between the pair of protruding portions, the plurality of pipes being fixed to the bridge member; and
- a connecting portion which connects the protruding portions and end portions of the bridge member to each other.

7. A pipe mounting structure, in a work machine, for mounting a plurality of pipes on an outer peripheral surface of at least one of a boom and an arm of the work machine, one end of the boom is liftably mounted to a base machine as a part of the work machine, and the other end of the boom is able to rotate about a horizontal axis, the pipe mounting structure comprising:
- a mounting portion, to which the plurality of pipes are mounted, the mounting portion being provided to at least one of the boom and the arm and having an upper plate, a lower plate provided at a position separated from the upper plate in a downward direction, and a pair of first and second side plates arranged on both sides in a width direction of the upper plate and the lower plate, wherein the upper plate, the lower plate, and the pair of first and second side plates form a tubular body, respective both side edges of the lower plate protruding outside the first and second side plates in the width direction of the upper plate to form a pair of protruding portions, the pair of protruding portions protruding outwardly from the tubular body;
- a bridge member which is bridged between the pair of protruding portions, the plurality of pipes being fixed to the bridge member; and
- a connecting portion which connects the protruding portions and end portions of the bridge member to each other.

8. A pipe mounting structure, in a work machine, for mounting a plurality of pipes on an outer peripheral surface of at least one of a boom and an arm of the work machine, one end of the boom is liftably mounted to a base machine as a part of the work machine, and the other end of the boom is able to rotate about a horizontal axis, the pipe mounting structure comprising:
- a mounting portion, to which the plurality of pipes are mounted, the mounting portion being provided to at least one of the boom and the arm and having an upper plate, a lower plate provided at a position separated from the upper plate in a downward direction, and a pair of first and second side plates arranged on both sides in a width direction of the upper plate and the lower plate, wherein the upper plate, the lower plate, and the pair of first and second side plates form a tubular body, respective lower end edges of the pair of first and second side plates protruding downward beyond the lower plate to form a pair of protruding portions, the pair of protruding portions protruding outwardly from the tubular body;
- a bridge member which is bridged between the pair of protruding portions, the plurality of pipes being fixed to the bridge member; and
- a connecting portion which connects the protruding portions and end portions of the bridge member to each other.

* * * * *